A. VERHOEVEN.
LIQUID GAGE FOR PRESSURE TANKS.
APPLICATION FILED MAY 17, 1909.
954,550.
Patented Apr. 12, 1910.
2 SHEETS—SHEET 2.
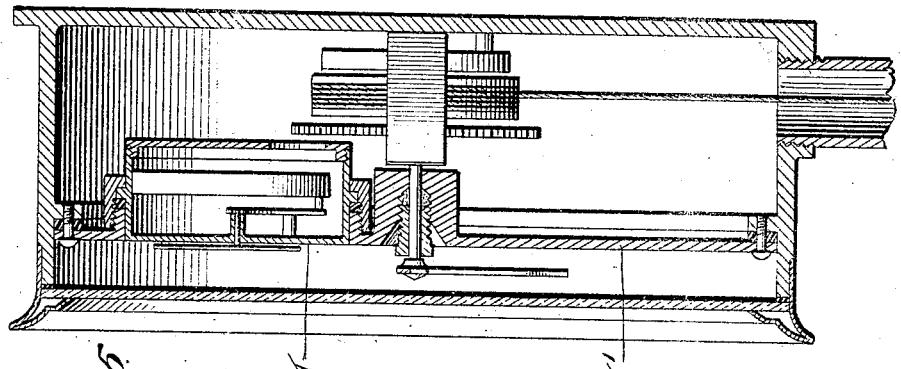
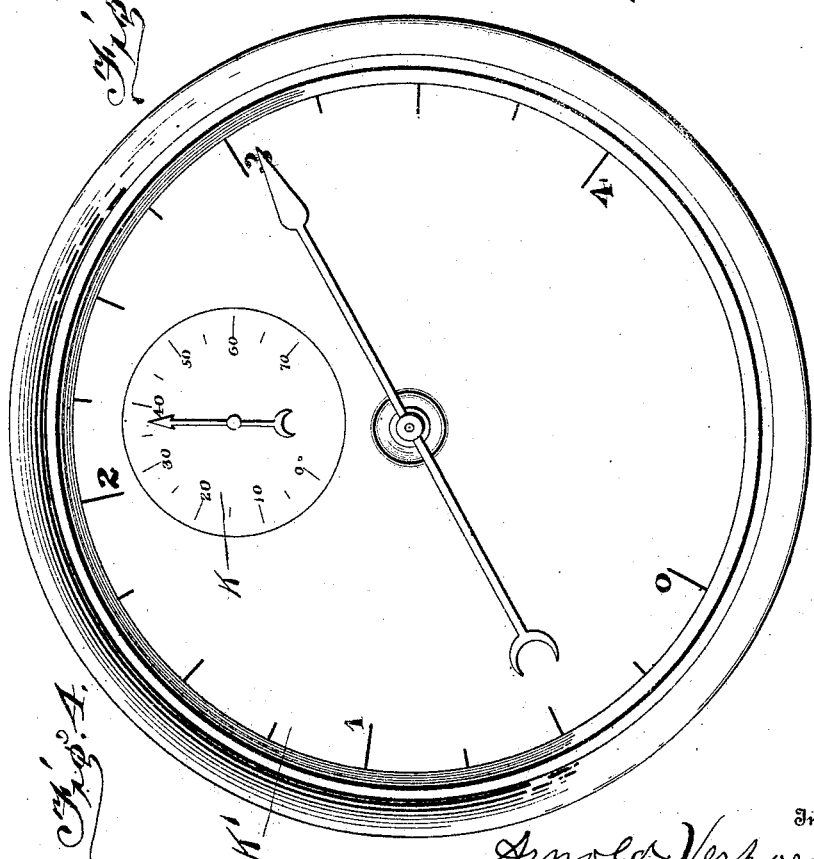

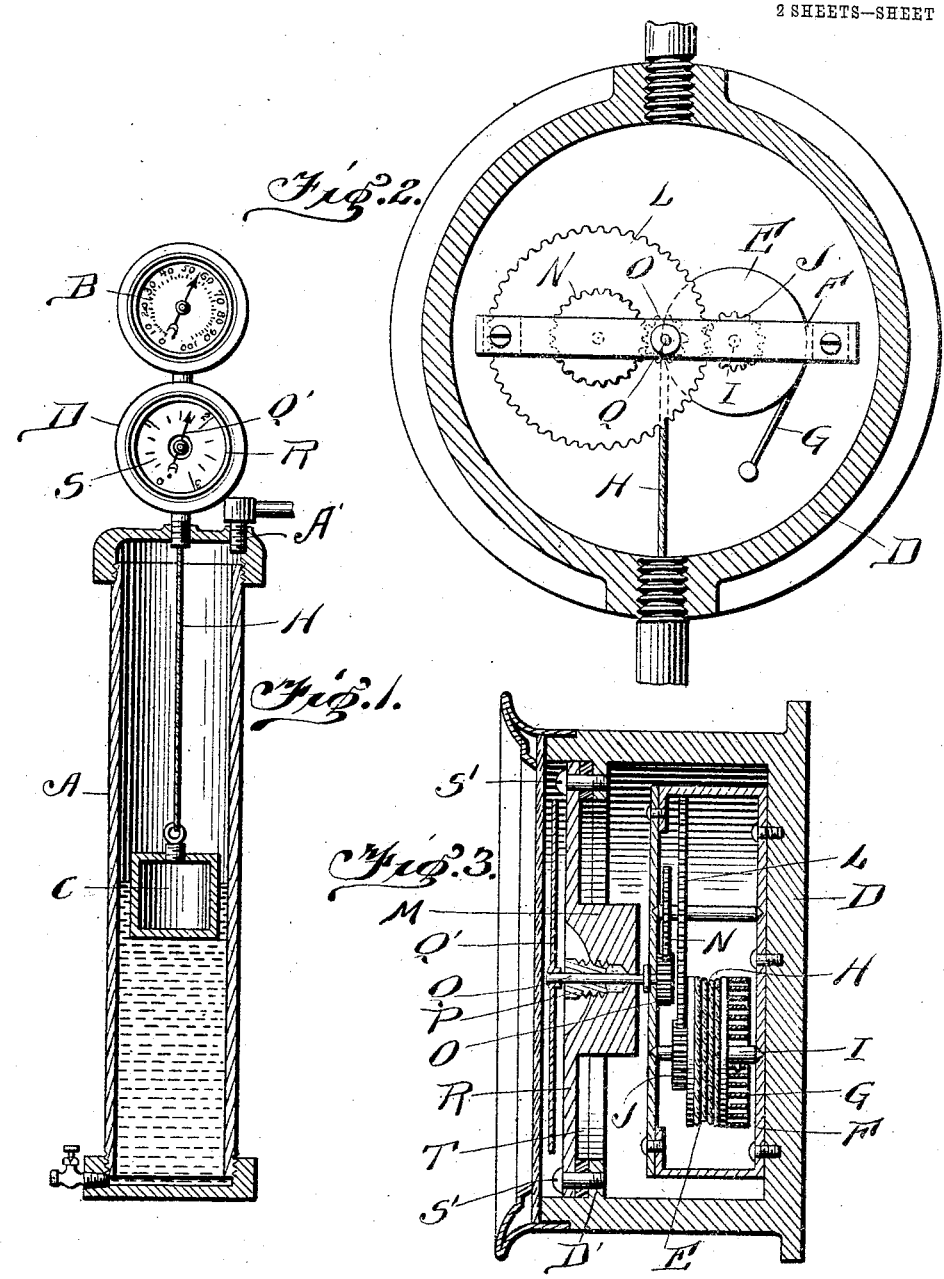

UNITED STATES PATENT OFFICE.

ARNOLD VERHOEVEN, OF MARIANNA, ARKANSAS.

LIQUID-GAGE FOR PRESSURE-TANKS.

954,550.    Specification of Letters Patent.   Patented Apr. 12, 1910.

Application filed May 17, 1909. Serial No. 496,547.

*To all whom it may concern:*

Be it known that I, ARNOLD VERHOEVEN, a citizen of the United States, residing at Marianna, in the county of Lee and State of Arkansas, have invented certain new and useful Improvements in Liquid-Gages for Pressure-Tanks; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in gages for determining the height of liquid in a tank, which liquid is under pressure, and comprises various details of construction, combinations and arrangements of parts which will be hereinafter fully described and then specifically defined in the appended claim.

My invention is illustrated in the accompanying drawings, in which:—

Figure 1 is a sectional view through a tank showing a pressure and a float actuated liquid gage connected thereto. Fig. 2 is a sectional view through the gage, and Fig. 3 is a section through the gage at right angles to the section shown in Fig. 2. Fig. 4 is a slight modification of my invention in which the pressure gage is shown as inclosed within the liquid gage, and Fig. 5 is a sectional view through the modified form.

Reference now being had to the details of the drawings by letter, A designates a tank adapted to contain liquid of any kind and is provided with the usual pressure gage B to indicate the pressure which is brought to bear upon the liquid. Said tank is provided with an opening A' whereby air may be forced into the tank to produce the required pressure. Mounted within the tank, which is hermetically sealed, in a float C, and D designates a gage having hermetically sealed tubular connection with said tank and mounted within the gage D is a reel E mounted in suitable bearings in the frame F and a spring G is fastened at one end to the wall of the gage D and its other end to said reel and affords means for reeling up the cord or rope H which is fastened at one end to and adapted to wind about the reel, while its other end is fastened to said float and passes through the tubular connection between the gage D and the tank, as shown. Said spring is designed, as the float rises, to reel up the slack cord or rope.

Fixed to the spindle I of the reel is a pinion wheel J which meshes with the teeth of the gear wheel L, also journaled in said frame F. A second gear wheel N is fixed to the gear wheel L and is of smaller diameter than the latter and meshes with the teeth of a pinion wheel O mounted upon and rotating with an indicating pointer shaft Q which is journaled in said frame F and carries a pointer Q' at its end adapted to indicate opposite the dial R of the gage D. The casing of said gage D is provided with an internal annular flange D' upon which a packing ring T is positioned, after which the metallic dial R is placed upon said packing and fastened hermetically to the casing by means of the screws S' passing through registering apertures in the dial and flange. Said dial is provided with a boss M projecting from the inner face thereof and is apertured centrally for the reception of the shaft carrying the indicating pointer. Said boss has a chambered portion adapted to receive a suitable gasket and the wall of said chambered portion is threaded and adapted to receive the threaded apertured plug P, the inner end of which is concaved and is adapted to bear against said gasket for the purpose of causing the latter to snugly bear against the indicating pointer shaft and produce a hermetically sealed joint. It will be noted that the outer marginal edge of the casing in which said dial is seated projects beyond the outer face of the dial and, when the dial is securely fastened therein, the operative parts within the gage D will be hermetically sealed.

In operation, when liquid under pressure is drawn from the tank, the float upon the surface of the liquid, lowering as the liquid is withdrawn, will indicate upon the dial of the gage D the amount of liquid remaining within the tank, this being possible by reason of the operative parts within the gage D being hermetically sealed without in any way affecting the indicating of the pressure gage, thus enabling a person to determine by a glance at the gage how much liquid remains within the tank without disturbing the pressure thereon.

In Figs. 4 and 5 I have shown a slight modification of my invention in which the pressure gage designated by letter K is mounted in the face of the dial of the liquid gage K′. By this construction two gages are brought at convenient location where the indication thereof may be readily noted.

What I claim to be new is:—

A float gage comprising an apertured gage box having an annular flange projecting from the inner periphery thereof, a dial fastened to said flange, said dial provided with an inwardly-extending boss projecting beyond said flange and centrally apertured and provided with a recess, a threaded plug fitted within said recess having an aperture, a pointer carrying shaft journaled in said plug and in the aperture in said boss, a pointer upon said shaft, a frame fitted to the inner surface of the rear wall of said box, a reel mounted in said frame, a float, a cord secured to the latter and winding about said reel and intermeshing gear wheels intermediate said reel and shaft, and a tank in which said float is adapted to be positioned and upon which the gage box is mounted, as shown and described.

In testimony whereof I hereunto affix my signature in the presence of two witnesses.

ARNOLD VERHOEVEN.

Witnesses:
J. C. WARD,
WM. P. MASTERS.